(12) United States Patent
Terao et al.

(10) Patent No.: US 6,502,971 B1
(45) Date of Patent: Jan. 7, 2003

(54) METHOD AND DEVICE FOR FASTENING SCREW BETWEEN BODY AND LENS OF VEHICULAR LIGHTING DEVICE

(75) Inventors: Kazumichi Terao, Shizuoka (JP); Takuya Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/578,485

(22) Filed: May 26, 2000

(30) Foreign Application Priority Data

May 26, 1999 (JP) .......................... 11-146702

(51) Int. Cl.⁷ .............................. F21P 1/00; B60Q 1/26
(52) U.S. Cl. ..................... 362/512; 362/267; 362/546; 362/455; 362/374; 362/375
(58) Field of Search .................. 362/267, 310, 362/374, 375, 509, 512, 546, 455

(56) References Cited

U.S. PATENT DOCUMENTS

| | | | |
|---|---|---|---|
| 5,365,810 A | 11/1994 | Inaniwa et al. | 81/430 |
| 5,477,441 A * | 12/1995 | Budnovitch et al. | 362/362 |
| 5,743,617 A * | 4/1998 | Sato et al. | 362/226 |
| 5,934,799 A * | 8/1999 | Suzuki et al. | 362/507 |

FOREIGN PATENT DOCUMENTS

| | | | |
|---|---|---|---|
| EP | 0 100 364 | 2/1984 | B25B/32/08 |
| GB | 2 304 881 | 3/1997 | F21V/31/02 |

* cited by examiner

Primary Examiner—Thomas M. Sember
(74) Attorney, Agent, or Firm—Sughrue Mion, PLLC

(57) ABSTRACT

An apparatus and a method for fastening a screw between a vehicular lighting device body and lens is provided, in which there is no possibility that a seal material drips out. A lamp body is held by the lower jig so that a seal groove is directed upward, and a front lens is held by an upper jig so that a seal leg is directed downward. The upper jig is lowered from a position above the lamp body and pressed together therewith, so that the seal groove and the seal leg are engaged together via a seal material. A fastening screw is positioned beneath the lamp body (seal groove) with the fastening screw directed upward by a screw fastener element located within a lower portion of the lower jig. The lamp body (seal groove) and the front lens (seal leg) are pressed and secured by the screw. No seal material drips out from the seal groove in the process. Further, the time required for pressing together and fastening the lamp body to the front lens can be shortened.

12 Claims, 11 Drawing Sheets

METHOD AND DEVICE FOR FASTENING SCREW BETWEEN BODY AND LENS OF VEHICULAR LIGHTING DEVICE

BACKGROUND OF THE INVENTION

1. Technical Field of the Invention

The present invention relates to a method of fastening a vehicular lighting device, comprising a lamp body and front lens, using a screw. Also, the present invention relates to a device for fastening the screw.

2. Description of the Related Art

A lighting device such as a headlamp is assembled as follows. After predetermined members such as a reflector (not shown) are housed in the lamp body 1 as shown in FIG. 11A, the seal groove 3 is filled with liquid seal material 4. Then the seal leg 6 is engaged with the seal groove 3, and the front lens 5 is coupled to the lamp body 1 by applying pressure as shown in FIG. 11B. Next, as shown in FIG. 11C, the front lens 5 and the lamp body 1, which comprise a vehicular lighting device, are inverted, and as shown in FIG. 12, the screw hole 6a is formed at a predetermined position in the seal leg 6 of the front lens 5, so that when the fastening screw 7 is screwed into the screw hole 6a with the driver 8, the screw can be fastened.

However, the aforementioned conventional screw fastening method is disadvantageous in that the vehicular lighting device comprising the front lens 5 and the lamp body 1 is coupled together by applying pressure, and the device must be inverted so that the lamp body 1 can be fastened to the front lens 5 and the screw hole 6a using fastening screw 7, which takes time and labor in the assembly of the lighting device.

Further, the following problems may be encountered. Since, during the screw fastening process, the lighting device is inverted, and the seal groove 3 is directed downward, there is a possibility that the seal material 4 may drip from the seal groove 3 in the process of fastening the screw. Therefore, it is necessary to pause the screw fastening process until the seal material 4 has solidified, causing a delay in the screw fastening process.

The present invention has been accomplished in order to solve the above problems caused in the prior art. It is an object of the present invention to provide a method and device of fastening a screw between a vehicular lighting device body and lens while keeping the sealing material from dripping.

SUMMARY OF THE INVENTION

In order to accomplish the above object, the present invention provides a method of fastening a screw between a vehicular lighting device body and lens, comprising the steps of: holding a lamp body by a body holding means so that a seal groove is directed upward; positioning a front lens using a lens holding means, so that a seal leg of the front lens is directed downward, and lowering the lens toward the lamp body; pressing the seal leg of the front lens and the seal groove of the lamp body together via seal material; positioning a fastening screw so that it is directed upward through the lamp body toward the front lens; and attaching the lamp body to the front lens by the fastening screw.

Also, the present invention provides a device for fastening a screw between a vehicular lighting device body and lens comprising: a body holding means for holding a lamp body so that a seal groove is directed upward; a lens holding means for positioning a front lens so that a seal leg is directed downward, lowering the front lens toward the lamp body held by the body holding means, and pressing the seal leg into the seal groove via a seal; and a screw fastener element for fastening a screw between the lamp body and the front lens when the fastening screw is positioned pointing upward through the lamp body toward the front lens.

According to the above structure, the lamp body and the front lens are pressed together so that the seal leg is engaged with the seal groove while the seal groove is open upward, and the screw fastened from beneath the lamp body, through the lamp body and into the front lens. Accordingly, there is no possibility that the seal material drips out from the seal groove.

Unlike the conventional attaching and screw fastening process, it is unnecessary to invert the vehicular lighting device assembly. Therefore, the process can be transferred to the screw fastening process immediately after the lamp body and front lens are assembled together.

The present invention also provides as a component of the vehicular lighting device screw fastening apparatus, the screw fastener element comprising: a screw fastener element case capable of being elevated by an elevating mechanism; a rod-shaped rotary bit extending upward and pivotally supported by the element case, having an engaging protrusion at the forward end thereof, capable of engaging with an engaging groove formed in the head of the fastening screw; and a cylindrical bit holder incorporated into the element case which is capable of moving in the vertical direction, and extending in such a manner that the cylindrical bit holder surrounds the rotary bit. The cylindrical bit holder may, for example, be within a guide path, which is aligned with a position at which the fastening screw is fastened to the lamp body held by the body holding means.

The screw fastener element (bit holder) is elevated by the elevating mechanism to a position aligned just beneath the estimated position of the lamp body, which is held by the body holding means, to which the fastening screw is to be inserted, that is, the screw fastener element is elevated by the elevating mechanism into a position just beneath the fastening screw insertion hole provided in the seal leg of the front lens. Then, the bit holder is elevated in the guide path until the forward end portion of the bit holder comes into contact with a predetermined bit holder contact portion in the guide path, or the forward end portion of the bit holder comes into contact with the lamp body exposed to the guide path, at which point the bit holder cannot be elevated any more. An engaging protrusion at the forward end of the rotary bit housed in the bit holder is engaged with an engaging groove formed in the fastening screw head, so that the rotary bit and the fastening screw integrally rotate in the circumferential direction. Therefore, when the rotary bit is elevated while it is rotating, the fastening screw engages with and pierces the lamp body (specifically, the wall on which the seal groove is formed) and is screwed into a predetermined screw insertion hole formed in the seal leg of the front lens.

The present invention also provides as a component of the vehicular lighting device screw fastening apparatus an air suction means for holding a supplied fastening screw in a vertical arrangement within the bit holder.

A downward air current created by the air suction means in the bit holder holds the fastening screw, supplied to the forward end portion of the bit holder, in a vertical arrangement, so that the engaging groove of the screw head and the engaging protrusion at the forward end of the rotary bit can be easily engaged with each other.

In the present invention, the body holding means has a lower jig for holding the lamp body so that the seal groove is directed upward and a jig support stand for holding and positioning the front lens sot that the seal leg is directed downward, and an elevating mechanism for elevating the upper jig. The present invention also includes a rodless air cylinder for elevating the screw fastener element, which is arranged in parallel with the screw fastener element at a lower position of the jig support stand. The air cylinder is supported by a horizontal oscillating mechanism so that the screw fastener element can be manipulated in the horizontal direction. The present invention further includes a screw inversion supply mechanism with a screw dropping port, fastening screw, which is supplied by a screw supply machine with the screw head directed upward, dropped and supplied to a forward end section of the bit holder of the screw fastener element. The screw inversion supply mechanism is arranged in a horizontal direction at a predetermined position separate from the lower jig of the jig support stand.

When the horizontal oscillating mechanism is driven, it is possible to smoothly move the screw fastener element in the horizontal direction between the screw dropping port location and the estimated screw fastening position.

The screw fastener element is maneuvered in the vertical direction, and requires space to operate. However, when a rodless air cylinder, in which no cylinder rod is required, is arranged in parallel with the screw fastener element, the entire height of the screw fastener element and its elevating mechanism can be reduced. Additionally, the air cylinder is provided with a holder guide for supporting the bit holder so that it can be maneuvered in the axial (vertical) direction.

The length of the bit holder is sufficiently long so that it can penetrate the body holding means in the vertical direction and reach the lamp body (seal groove). As a result, when the screw fastener element (bit holder) is elevated, the forward end portion of the bit holder tends to swing. Therefore, it is difficult to appropriately guide the forward end portion of the bit holder to the guide path. However, the holder guide provided in the rodless air cylinder suppresses the swing of the bit holder, so that the forward end portion of the bit holder can be appropriately guided to the guide path of the lower jig.

The aforementioned horizontally oscillating mechanism includes a two-axis scalar robot. The robot includes a first arm horizontally oscillating round a first vertical axis fixed to the jig support stand, and a second arm horizontally oscillating round a second vertical axis arranged at an oscillating forward end section of the first arm.

The operation of the first and the second arms are controlled by a drive control section of the two-axis scalar robot, so that the screw fastener element can be smoothly and effectively moved in the horizontal direction between the screw dropping port location and the estimated screw fastening position.

DETAILED DESCRIPTION OF THE PREFERRED EMBODIMENTS

Figure 1:
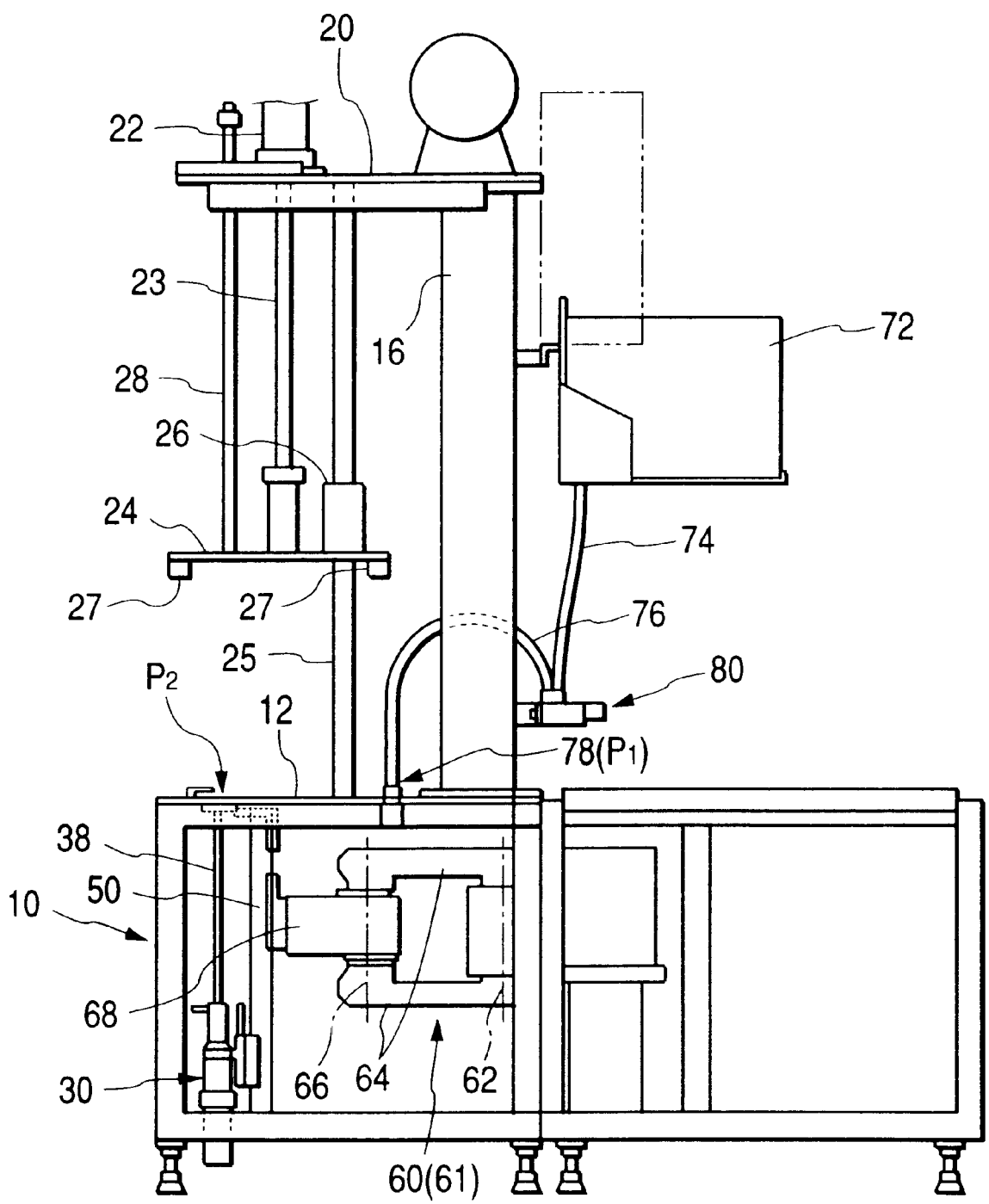
FIG. 1 is a side view showing a device for attaching a body of a lens of a headlamp, and for automatically fastening a screw therethrough which is the first embodiment of the present invention.

Next, the preferred embodiments of the present invention will be explained with reference to the following examples.

As shown in the drawings, the vehicular lighting device (headlamp) body and lens attaching and automatic screw fastening apparatus is composed as follows. There is provided a rectangular jig support stand 10 (FIGS. 1, 2 and 9) composed of a frame structure in which a screw fastener element 30 is arranged. In the jig support stand 10, there is provided a base plate 12 on which the lower jig 120 can be mounted. In an upper portion of the jig support stand 10, there is provided a ceiling plate 20 supported by a pair of side frames 16. There is also provided an upper jig holding plate 24 supported by air cylinders 22, which are elevating mechanisms, slidably attached to the ceiling plate 20.

Reference numeral 23 is a cylinder rod of the air cylinder 22. A lower end portion of the cylinder rod 23 is connected with the upper jig holding plate 24. Reference numeral 25 is a guide shaft arranged between the ceiling plate 20 and the jig support stand 10. A guide 26 attached to the upper jig holding plate 24 is slidably attached to the guide shaft 25. Reference numeral 28 is a second guide shaft arranged between the ceiling plate 20 and the upper jig holding plate 24.

At the four corners of the upper jig holding plate 24, there are provided clamps 27 which are the mechanism for connecting and holding the upper jig 110 (FIG. 9) so that the upper jig 110 hangs beneath the clamps 27. The upper jig holding plate 24 can be lowered with respect to the lower jig 120, mounted at a predetermined position on the base plate 12 and the upper jig 110 can be made to come into contact with the lower jig 120. The clamps 27 hold the upper plate 112 of the upper jig 110. Thus, the upper jig 110 is integrally connected with the upper jig holding plate 24.

On the upper plate 112 of the upper jig 110, there are provided a plurality of plungers 116 (FIGS. 3A and 3B), with plunger pins 116a which can protrude upward. When the plunger pins 116a protrude upward, and are engaged with the pin engaging holes 13 formed on the upper jig upper plate 112, the upper jig upper plate 112 and the upper jig 110 can be affirmatively positioned in the horizontal direction.

On the base plate 12, there are formed holes (not shown in the drawing) capable of engaging with rollers (not shown in the drawing) provided at four corners of the bottom of the lower jig 120. When each roller engages with each hole, the bottom surface of the lower jig 120 comes into contact with the base plate 12, and the lower jig 120 can be approximately positioned at predetermined positions on the base plate 12. On the lower plate 122 (FIGS. 3A and 3B) of the lower jig 120, there are provided a plurality of plungers 126 with plunger pins 126a which can project downward. When the plunger pins 126a protrude downward, and are engaged with the pin engaging holes 15 on the base plate 12, the lower jig 120 can be accurately positioned at the predetermined positions on the base plate 12.

On the base plate 12, there is formed an opening 13 (shown in FIGS. 4 and 6) used when screws are fastened by the screw fastener element 30 between he seal groove 302 (FIG. 7) of the lamp body 300, supported by the jig 100, and the seal leg 202 of the front lens 200.

Figure 3A:
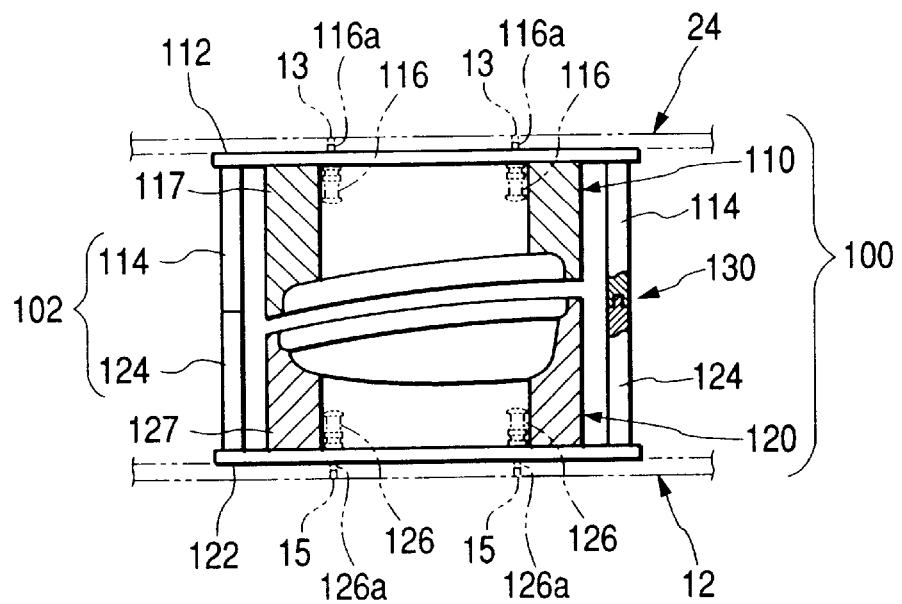
FIG. 3A is a front view of the jig used for the device.
Figure 3B:
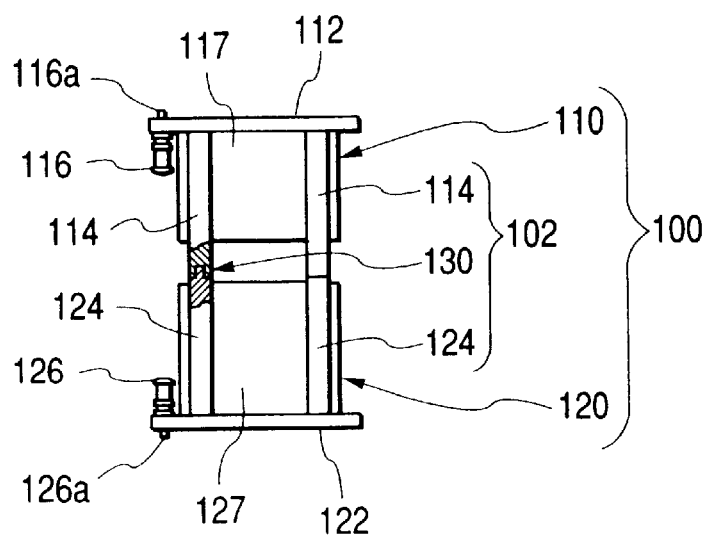
FIG. 3B is a side view of the jig.

As shown in FIGS. 3A and 3B, the jig 100 (including upper jig 110 and lower jig 120) used for this device is composed in such a manner that the substantially rectangular upper plate 112 and lower plate 122, the sizes of which are the same, are connected with each other by four supports 102. Each of the four supports 102 comprises a two piece structure of an upper piece 114 and a lower piece 124, of substantially equal length in the longitudinal direction.

The jig 100 comprises the upper jig 110, from the upper plate 112 of which four legs 114 extend, and the lower jig 120, from the lower plate 122 of which four legs 124 extend. The four legs 114 of the upper jig 110 are respectively aligned with the four legs 124 of the lower jig 120. When the supports 102, including a pair of legs 114 and 124, are engaged with each other in the axial direction in such a manner that protrusions are engaged with recesses, the upper jig 110 and the lower jig 120 become an integral unit of the jig 100. Reference numeral 130 (FIGS. 3A and 3B) represents an engaging portion in which the protrusion and recess are engaged with each other. As described above, the rollers are provided in the bottom portion of the lower jig 120, so that the lower jig 120 can easily travel on the base plate 12.

Figure 9:
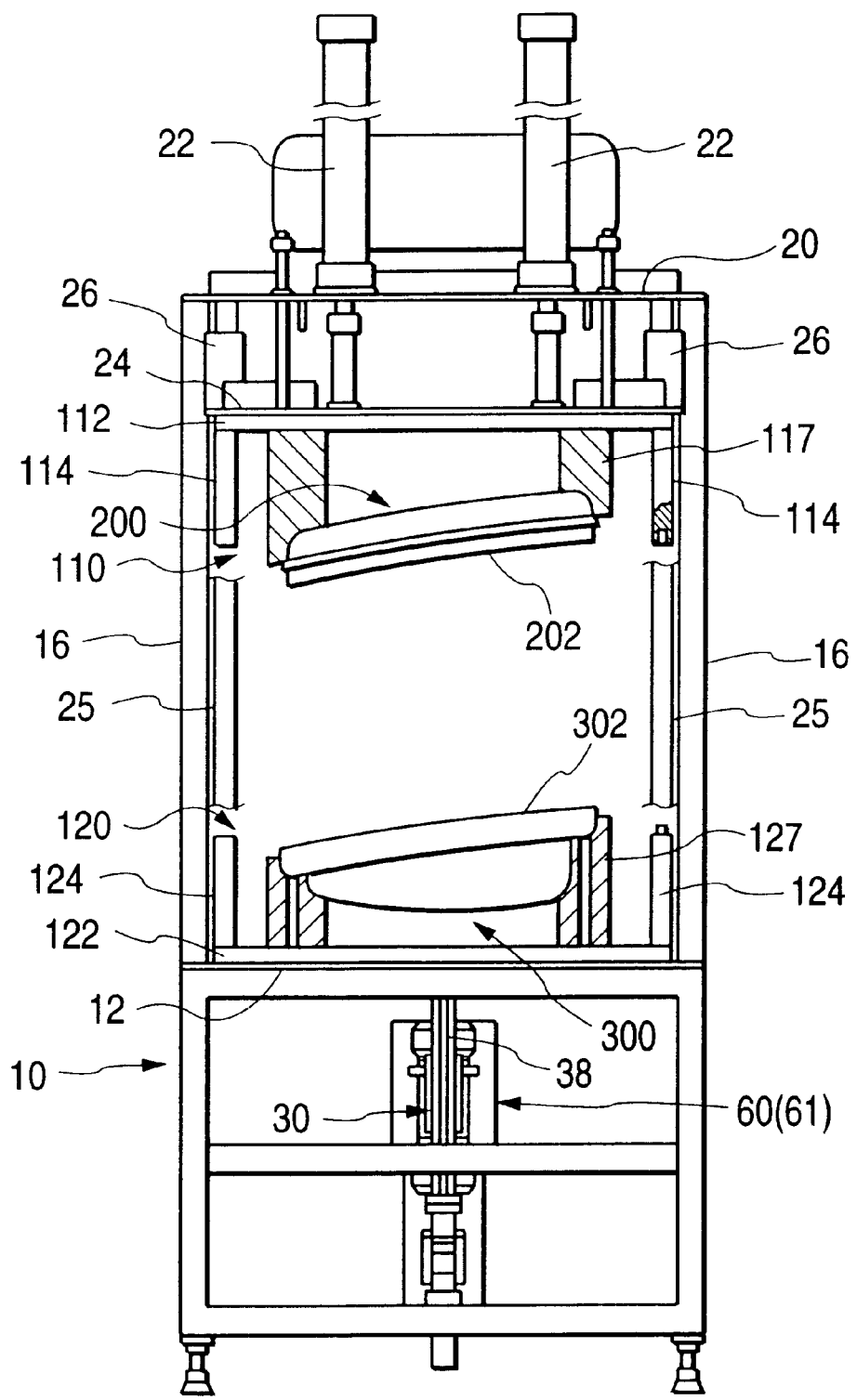
FIG. 9 is a front view of the device in which the jig is set.

In the upper jig 110, there is provided a cylindrical lens holding frame 117 capable of holding an outer circumferential edge of the front lens 200. The front lens 200 can be engaged with the support frame 117 from the underside thereof, so that the seal legs 202 can be directed downward. Negative pressure (vacuum) is applied inside the holding frame 117 via the negative pressure generating port (not shown) arranged on the upper plate 112. Due to the above structure, the front lens 200 is secured to the holding frame 117 which extends from and is supported by the upper jig 110 as shown in FIG. 9.

On the other hand, in the lower jig 120, there is provided a cylindrical body holding (support) frame 127 capable of holding an outer circumferential portion of the lamp body 300. The lamp body 300 can be engaged with the holding frame 127 from the upper side thereof so that the seal groove 302 can be directed upward. In the holding frame 127, there is provided a fixing mechanism (not shown) for securing a circumferential portion of the lamp body 300 that has been engaged. Due to the above structure, the lamp body 300 is secured to the holding which extends from and is supported by the lower jig 120 as shown in FIG. 9.

Figure 7:
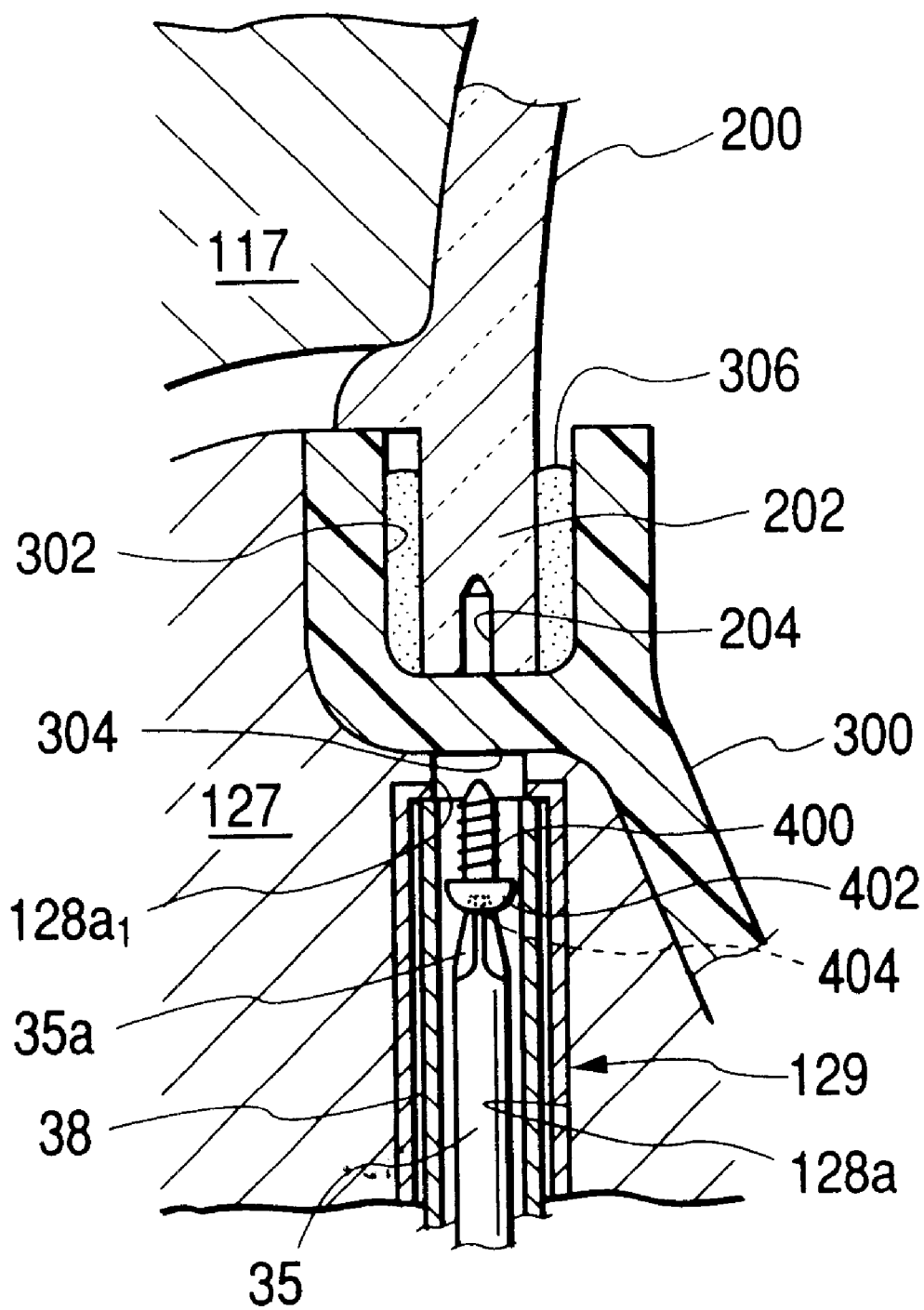
FIG. 7 is an enlarged cross-sectional view showing a screw fastening portion between the seal groove and the seal leg.

The seal legs 202 of the front lens 200 are arranged on the circumference of the front lens 200. As shown in FIG. 7 which is an enlarged view within the seal legs 200, there are a provided insertion holes 204 for positioning the fastening screws 400 at predetermined positions on the circumference. When the fastening screws 400 are screwed into the screw insertion holes 204 from the seal groove bottom side face wall 304, the seal legs 202 and the seal grooves 302 can be mechanically secured to each other. That is, the front lens 200 and the lamp body 300 can be mechanically attached to each other.

Figure 6:
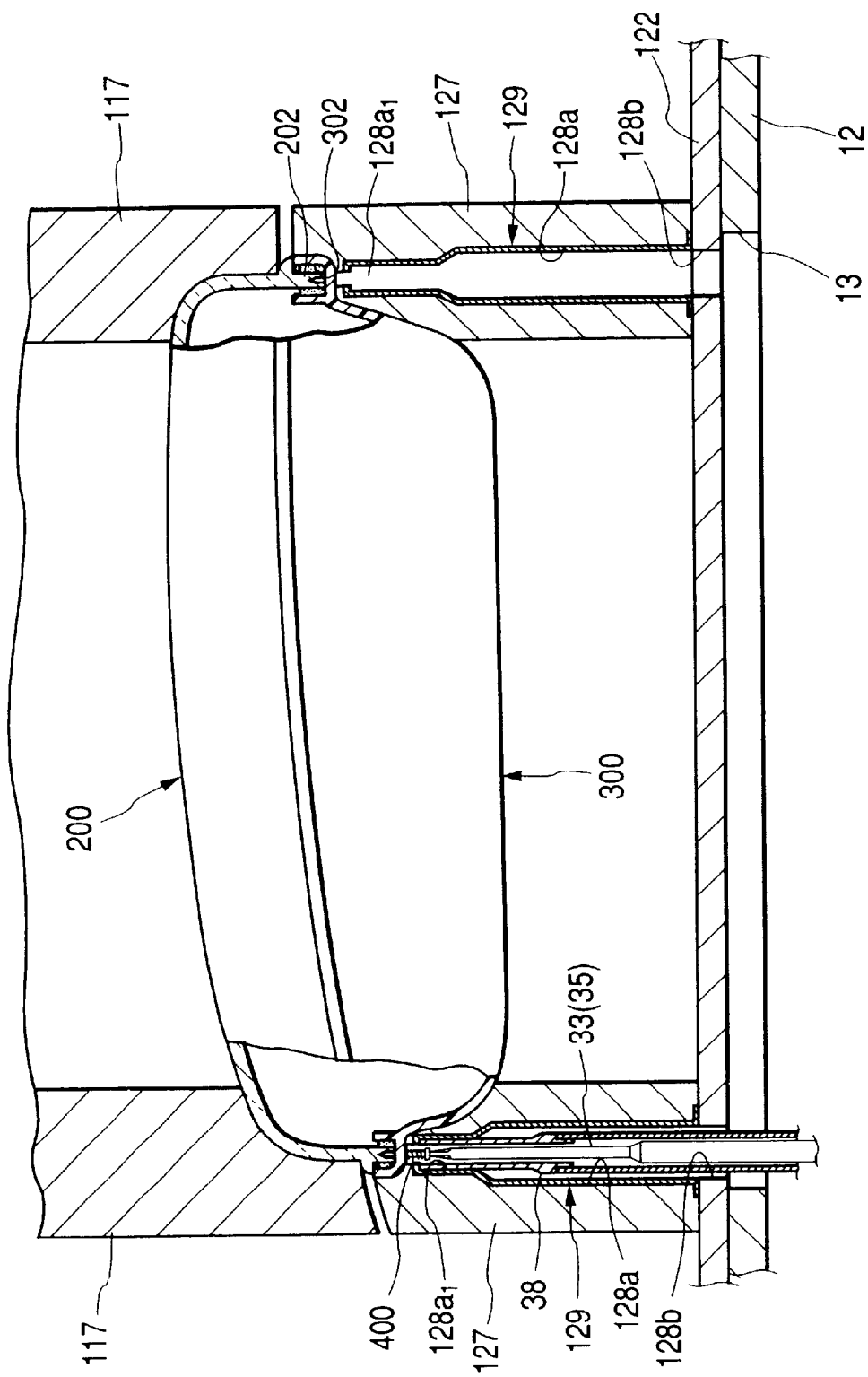
FIG. 6 is a cross-sectional view showing a seal groove of a lamp body, which is supported by the jig, and a seal leg of a front lens screwed together.

As shown in FIG. 6, the support frame 127 of the lower jig 120 is a little larger than the opening 13 of the base plate 12 of the jig support stand 10, and the upper 128a and the lower 128b through-holes formed in the support frame 127 and the lower plate 122, correspond to the screw insertion holes 204 holes 204 formed in the seal legs 202 of the front lens 200. Screw fastening is conducted by the screw fastener element 30 (bit holder) via the upper 128a and the lower 128b through-holes. In this structure, each through-hole 128a is composed of a metallic cylindrical body 129 incorporated with the support frame 127. The hole 128a is comprised of a bit holder insertion hole into which the bit holder 38 of the screw fastener element 30, which will be described later, can be inserted.

Inside the jig support stand 10, under the base plate 12, the screw fastener element 30 (FIG. 2) is supported by the two-axis scalar robot 60 in such a manner that it can be maneuvered in the horizontal direction.

Figure 4:
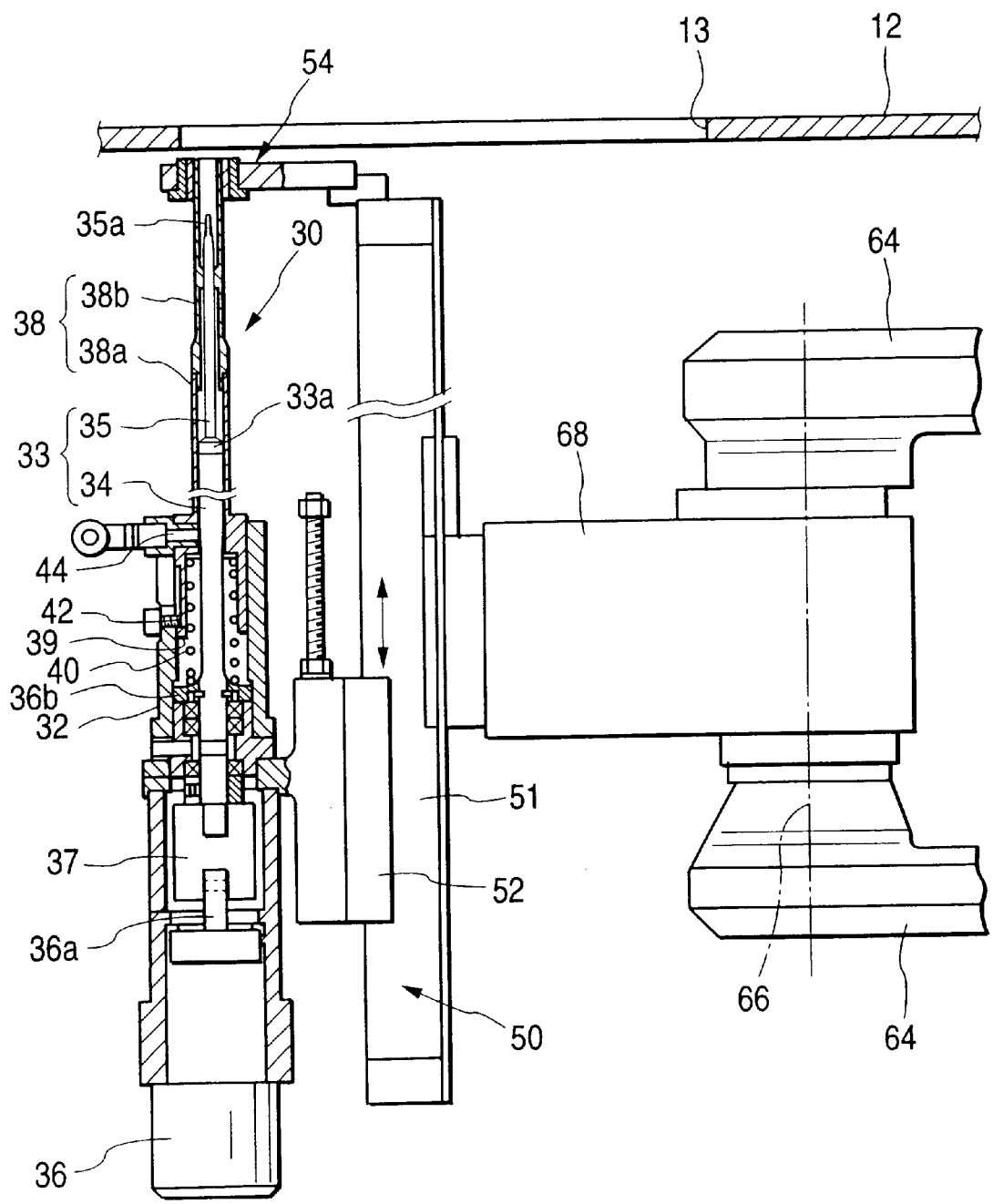
FIG. 4 is an enlarged cross-sectional view showing a screw fastener portion of the device.

As shown in FIG. 4, the screw fastener element includes: a cylindrical case 32 extending vertically; a long and slender rod-shaped rotary bit 33 which is pivotally supported by the case 32 and extends upward from the front end opening of the case 32; a drive motor 36 which is housed in the case 32 and rotates the rotary bit 33; and a bit holder 38 which is incorporated into the case 32 in such a manner that it can be slid in the axial direction and extends in such a manner that it surrounds the rotary bit 33.

Between the base end portion of the bit holder 38 and the bearing holder 36b in the case 32, there is provided a compression spring 40, so that the bit holder 38 can be pushed upward by the spring. Reference numeral 42 is a stopper coming into contact with the hook portion 39 arranged on the base end side of the bit holder 38.

The rotary bit 33 includes: a rotary shaft 34 connected with the output shaft 36a of the motor 36 via the coupling 37; and a bit body 35 which is secured to the forward end portion of the rotary shaft 34 in such a manner that the bit body 35 and rotary shaft 34 form an integrated linear body. Reference numeral 33a is a screw connecting section in which the rotary shaft 34 and the bit body are connected with each other. As shown in FIG. 5, at the forward end portion of the bit body 35, there is provided an engaging protrusion 35a capable of engaging the cross groove 404 of the head 402 of the fastening screw 400. When the engaging protrusion 35a engages with the cross groove 404, the fastening screw 400 is integrated with the bit body 35 (rotary bit 33) in the circumferential direction.

On the forward end side of the bit holder 38, there is provided a screw holder 38b. The fastening screw 400 dropped into the bit holder 38 (screw holder 38b) in such a manner that the head 402 of the screw is directed downward. Then, the fastening screw 400 drops along the bit holder 38 (screw holder 38b) while the head 402 is oriented downward, and finally the screw head 402 comes into contact with the forward end portion of the bit body 35. At the lower end portion of the bit holder 38, there is provided a negative pressure (vacuum) suction port 44 (shown in FIG. 4) from which negative pressure is produced from the outside. Therefore, a downward air current is created in the bit holder 38 (*screw holder 38b), and the fastening screw 400 is vertically held. Due to the foregoing, the cross groove 404 of the fastening screw 400 can easily engage with the engaging protrusion 35a.

Even in the case in which the fastening screw 400 is not initially engaged with the engaging protrusion 35a of the forward end of the bit body 35, no problems are caused, because the cross groove 404 of the screw head 402 readily engages the engaging protrusion 35a when the rotary bit 33 is rotated.

The bit holder has a linear shape and comprises the screw holder 38b and bit holder body 38a. The diameter of screw holder 38b is smaller than that of the bit holder body 38a, and is integrally screwed to the forward end portion of the bit holder body 38a. It is an object of the present invention that a very strong downward air current is created in the screw holder 38b, and further that the screw holder 38b is capable of appropriately guiding the bit body 35 and screw 400. In order to attain the above objects, it is preferable that the clearance formed between the bit body 35 (fastening screw 400) and the screw holder 38b is rather small. Therefore, a difference between the outer diameter of the screw head 402 (bit body 35) and the inner diameter of the screw holder 38b is set at a relatively low value.

On the other hand, in order to prevent the long bit holder 38 from swinging and also in order to ensure the mechanical strength of the bit holder 38, as well as to allow the rotary bit 33 (rotary shaft 34) to rotate smoothly even while the load on the rotary bit 33 is reduced, and also in order to slide the bit holder body 38a smoothly in the axial direction with respect to the rotary bit 33, it is preferable that the diameter of the bit holder body 38a and the clearance between the rotary bit 33 and the bit holder 38a be increased. For the above reasons, the clearance between the inner diameter of the bit holder body 38a and the outer diameter of the rotary shaft 34 is set at a relatively high value.

In other words. when the diameter of the screw holder 38b is reduced, the fastening screw 400 and the forward end portion of the bit body 35 can be smoothly engaged with each other, and the fastening screw 400 can be appropriately guided. At the same time, when the diameter of the bit holder body 38a is increased, the rotary bit 33 can be smoothly rotated, and the bit holder 38 can be smoothly slid in the vertical direction, and further the mechanical strength of the entire bit holder 38 can be enhanced. Next, referring to FIGS. 5A and 5B, the structure of the screw holder 38b will be explained in detail.

As shown in these drawings, there is provided a male screw section $38b_1$ at the rear end thick portion of the screw holder 38b. On the other hand, there is provided a female screw section $38a_1$ at the upper end portion of the bit holder body 38a. When the male screw section $38b_1$ is secured to the female screw section $38a_1$, the bit holder body 38a and the screw holder 38b are integrally attached to each other.

At the substantial center of the screw holder 38b in the longitudinal direction, there is provided a small diameter section 39 of a predetermined length in which six longitudinal grooves 39a are formed on the inner circumferential surface at regular intervals in the circumferential direction, so that an appropriate downwardly directed air current (laminar flow) can be created in the screw holder 38b. Even when the bit holder body 35 tilts in either direction and comes into contact with the inner circumferential surface of the screw holder 38b, air passages will always be formed between the bit body 35 and the inner circumferential face of the screw holder 38b by these longitudinal grooves 39a. Further, a downwardly directed rectified air current is always formed around the bit body 35 by the plurality of air passages. Accordingly, the fastening screw 400 in the screw holder 38b can be positively held in a vertical position with the head 402 oriented downward.

Figure 5A:
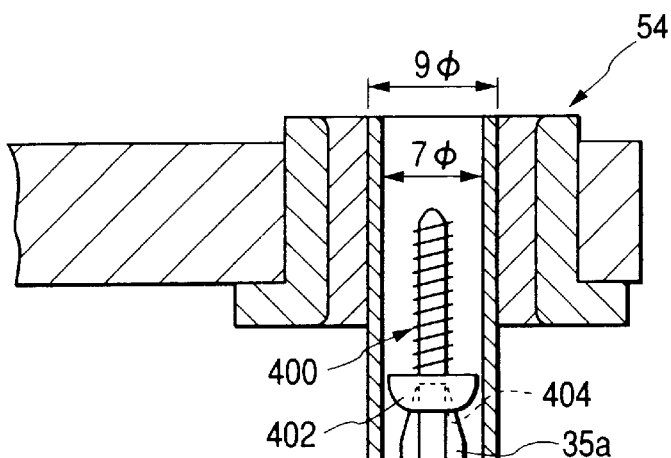
FIG. 5A is an enlarged longitudinal cross-sectional view of a screw holder formed at the forward end of a bit holder of the device.
Figure 5B:
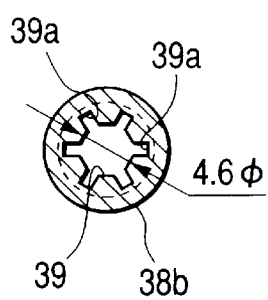
FIG. 5B is a horizontal cross-sectional view of the screw holder taken on line V—V in FIG. 5A.
Figure 5B:
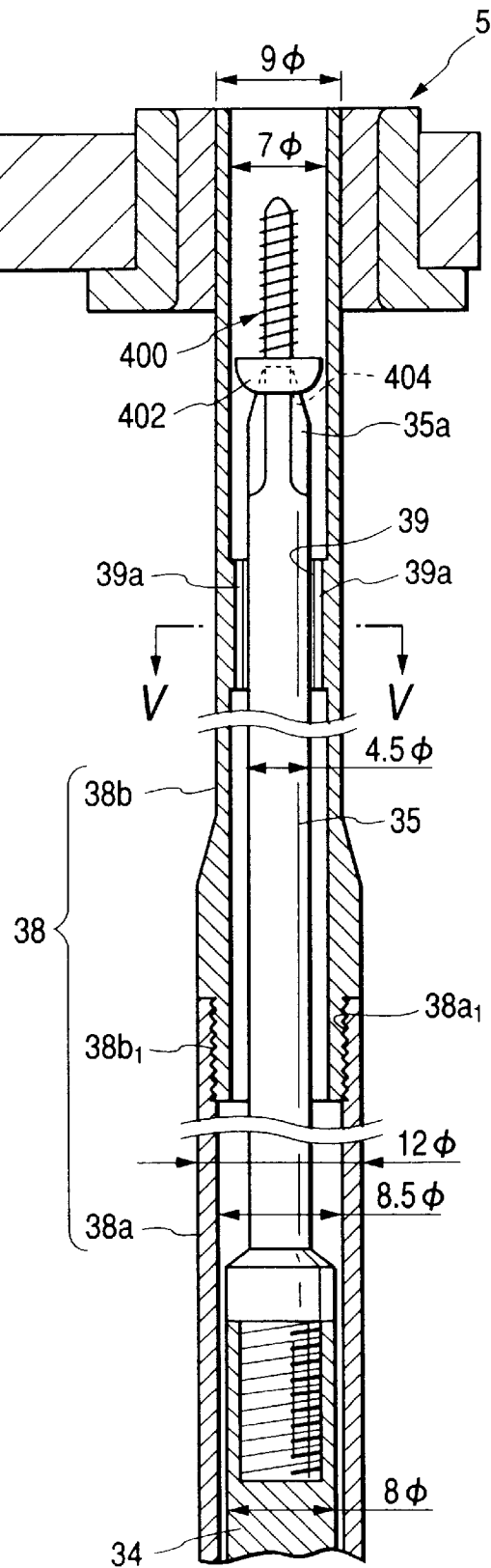

In FIGS. 5A and 5B, the size of each element is described as follows. The outer diameter of the bit body 35 is 4.5 mm, the inner diameter (outer diameter) of the screw holder 38b is 7 (9) mm, and the inner diameter of the small diameter portion 39 of the screw holder 38b is 4.6 mm. Therefore, the clearance between the bit body 35 and the small diameter portion 39 of the screw holder 39 is 0.1 mm which is very small. On the other hand, the outer diameter of the rotary shaft 34 is 8 mm, and the inner diameter of the bit holder body 38a is 8.5 mm. Therefore, the clearance between the rotary shaft 34 and the bit holder body 38a is 0.5 mm which is relatively large.

Figure 2:
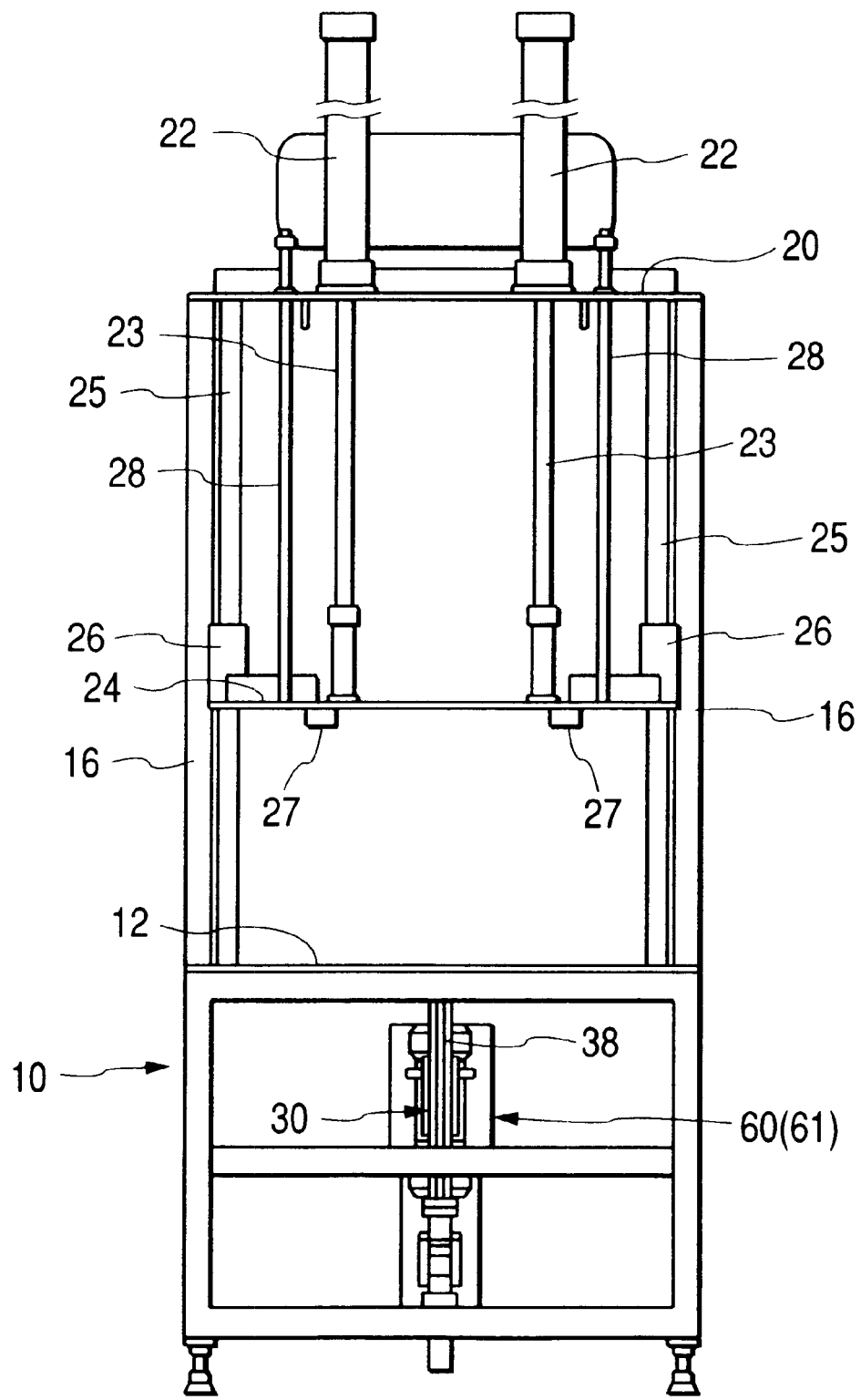
FIG. 2 is a front view of the device.

As shown in FIGS. 1 and 4, the screw fastener element 30 is arranged in parallel with the rodless air cylinder 50 which is supported by the arm 68 of the two-axis scalar robot 60 and extends in the vertical direction. Therefore, the screw fastener element 30 can be elevated by the rodless air cylinder 50.

The rodless air cylinder 50 is of a prior art type and has the following design. Longitudinal slits (not shown) are formed on the side of the cylinder body 51. Yokes penetrate these longitudinal slits and extend from the piston (not shown) arranged in the cylinder body 51 and are connected with the sliding piece 52, and at the same time the slits are sealed by metallic sealing members, so that the cylinder body 51 can be tightly sealed. The sliding piece 52 slidably incorporated into the cylinder body 51 is connected and integrated with the case 32 of the screw fastener element 30. Therefore, when the rodless air cylinder 50 is operated, the screw fastener element 30 is integrally elevated together with the sliding piece 52.

Next, the fastening operation of the apparatus will be explained in which the screw fastener element 30 fastens the seal groove 302 of the lamp body 300 to the seal leg 202 of the front lens 200 by screwing.

At the estimated screwing position $P_2$ of the lamp body 300, beneath the bit holder insertion hole 128a, the rodless air cylinder 50 is operated, and the screw fastener element 30 (bit holder 38) is elevated. When the bit holder 38 is inserted into the through-hole (bit holder insertion hole) 128a and elevated, the forward end portion comes into contact with the forward end step portion $128a_1$ (shown in FIGS. 6 and 7) of the insertion hole 128a, and the bit holder 38 can not be elevated any more. Therefore, portions of the screw fastener element 30 except for the bit holder 38 are elevated, and the bit holder 38 is relatively retracted with respect to the case 32. When the bit holder 38 is retracted a predetermined distance, the retraction of the bit holder 38 is detected, and the rotary bit 33 begins rotating. Then, the screw fastener element 30 is elevated under a load which resists a pushing force of the pushing spring 40 which elevates the bit holder 38. The forward end engaging protrusion 35a of the rotary bit 33 housed in the bit holder 38 engages with the cross groove 404 of the head 402 of the fastening screw, so that the rotary bit 33 and the fastening screw 400 are integrally engaged in the circumferential direction. Accordingly, when the rotary bit 33 is rotated and elevated, it pierces the lamp body 300 (the seal groove bottom wall 304), and the fastening screw 400 is screwed into the predetermined insertion hole 204 of the front lens 200 (the seal leg).

In the case where a common air cylinder, in which a cylinder rod is arranged in the cylinder body, is used for elevating the screw fastener element 30, it is necessary to connect the screw fastener element 30 with the air cylinder in series. Therefore, the length of the screw fastener element is increased. Accordingly, a problem may be caused in which the height of the jig support stand 10 is increased.

However, in this embodiment, the rodless air cylinder 50 having no cylinder rod is used for the air cylinder for elevating the screw fastener element 30, and the screw fastener element 30 and the rodless air cylinder 50 are arranged and connected in parallel with each other. Therefore, the overall arrangement of the screw fastener element 30 and the elevating mechanism can be made compact in the vertical direction, that is, the height of the jig support stand 10 can be decreased. Therefore, the jig 100 is easily moved on the base plate 12, and further the height of the overall screw fastening device can be decreased.

At the upper end portion of the rodless air cylinder 50, there is provided a holder guide 54 as shown in FIG. 4. The bit holder 38 (screw holder 38b) of the screw fastener element 30 is slidably supported by this holder guide 54 so that it can be slid in the vertical direction.

The length of the bit holder 38 is long enough that the bit holder 38 can vertically penetrate the holding frame 127 and reach the lamp body 300. Accordingly, there is a possibility that when the screw fastener element 30 (bit holder 38) is elevated, the forward end portion of the bit holder 38 swings and can not be appropriately guided into the through-hole (guide insertion hole) 128a of the lower jig 120 (the support frame 127). However, since the bit holder 38 is guided by the guide holder 54, the forward end portion of the bit holder 38 can be appropriately guided into the through-hole (guide insertion hole) 128a of the lower jig 120 (the holding frame 127) without swinging.

As shown in FIG. 1, the two-axis scalar robot 60 is provided with a horizontal oscillating mechanism 61 including: a pair of first arms 64 which horizontally oscillate round the first vertical shaft 62 fixed to the jig support stand 10; and a second arm 68 which horizontally oscillates round the second vertical shaft 66 arranged at the oscillating forward end portion of the first arms 64. This horizontal oscillating mechanism 61 allows the screw fastener element 30 to be smoothly and effectively moved between the estimated screw dropping port $P_1$ and the predetermined screw fastening position $P_2$.

The operational procedures of the first arms 64 and the second arm 68 are input into the drive control section (not shown), which controls the operation of the two-axis scalar robot 60 prior to initial operation, and the screw fastener element 30 reciprocates between the screw dropping position $P_1$ at which the fastening screw 400 is dropped into the bit holder 38 and the estimated screw fastening position $P_2$. In this way, the screw fastening process is accomplished.

Figure 8A:
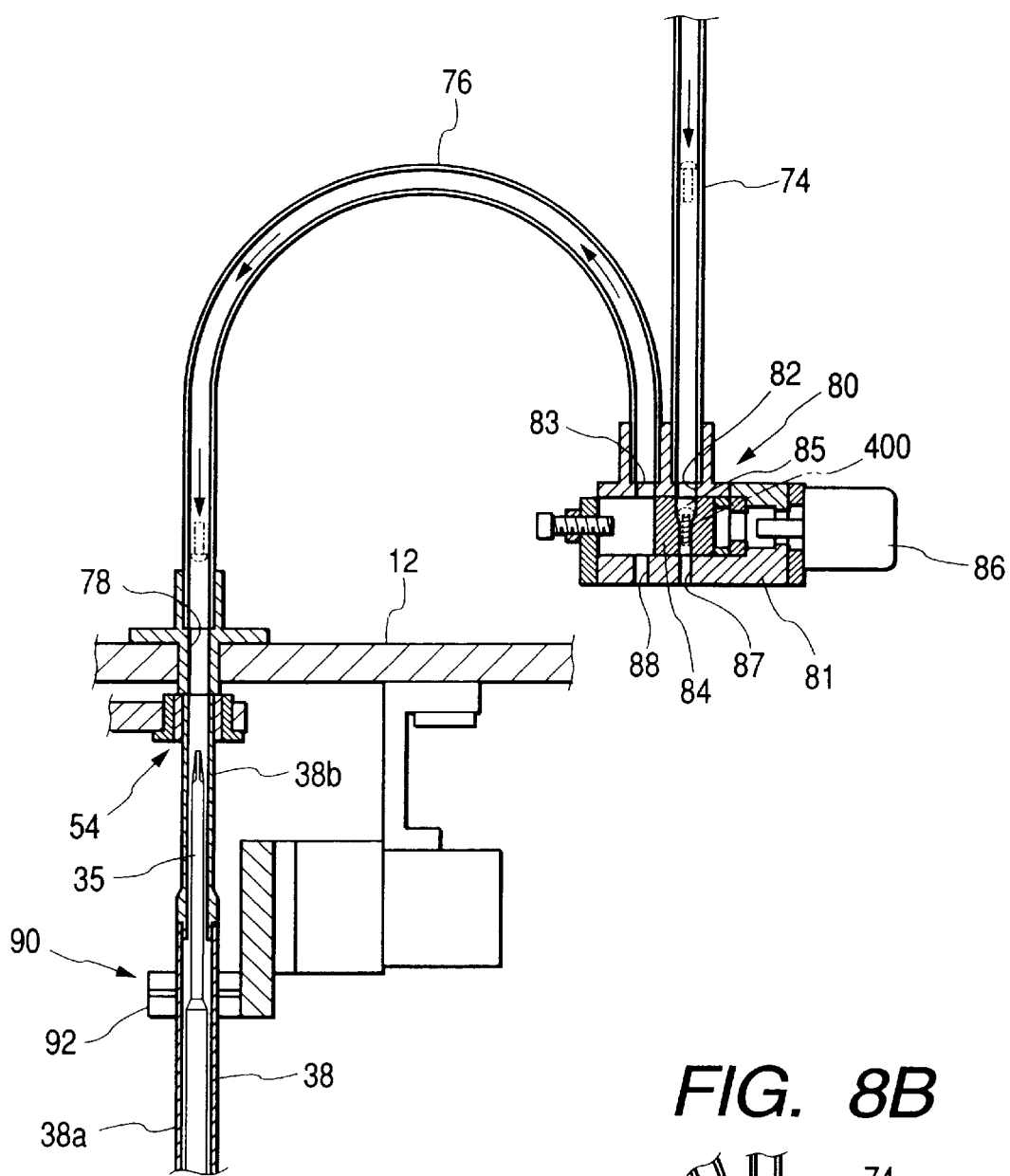
FIG. 8A is an overall view of the arrangement of the inversion supply mechanism portion of the device.
Figure 8B:
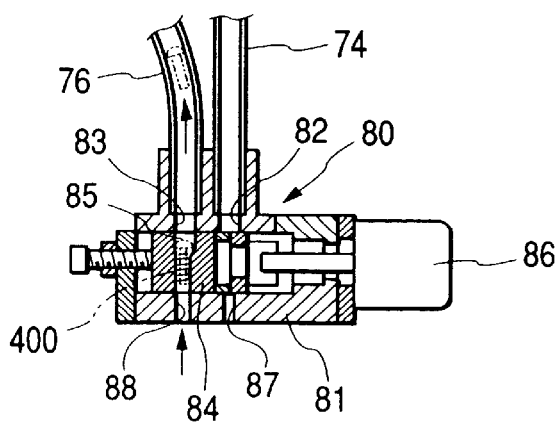
FIG. 8B is a cross-sectional view showing the screw inversion supply mechanism in which a screw is being inverted.

As shown in FIGS. 1, 8A and 8B, the screw inversion supply mechanism 70 includes: a screw supply machine 72 fixed to an upper portion of the side frame 16 for supplying the fastening screw 400, the head of which is directed upward; and a screw inversion supply machine 80 which is fixed to the side frame 16 arranged on a lower position of the screw supply machine 72, for inverting the fastening screw 400, the head of which is directed upward as supplied by the screw supply machine 72, and for dropping the fastening screw 400 into the screw dropping port 78. Reference numerals 74 and 76 are hoses for conveying the fastening screws.

As shown in FIGS. 8A and 8B, the screw inversion supply machine 80 is arranged in such a manner that the sliding piece 84 in which the screw accommodating hole 85 is formed is slidably enclosed in the casing 81, on the side of which adjoining screw supply hole 82 and the screw discharge hole 83 are formed. The air cylinder 86 moves the sliding piece 84 in the traverse direction, and the sliding piece 84 can be set so that the screw accommodating hole 85 opposes the screw supply hole 82 or the screw accommodating hole 85 is opposed to the screw discharge hole 83.

In the casing 81, there are provided discharge ports 87, 88 which oppose the screw supply hole 82 and the screw discharge hole 83, and further interconnect with these holes 82, 83 via the screw accommodating hole 85 of the sliding piece 84. When compressed air supplied from the screw supply machine 72 to the hose 74 is discharged from the discharge port 87 via the screw supply hole 82 and the screw accommodation hole 85, the fastening screw 400 is conveyed in the hose 74 by the compressed air while the head of the fastening screw 400 is directed upward, so that the fastening screw 400 is accommodated in the screw accommodation hole 85 while the head of the fastening screw 400 is being upward. As shown in FIG. 8B, when the sliding piece 84 is moved to the left, the inlet hole (discharge port) 88, screw accommodation hole 85 and screw discharge hole 83 are interconnected with each other. Therefore, the compressed air is supplied into the screw accommodation hole 85 via the inlet hole 88. Accordingly, the fastening screw 400 accommodated in the screw accommodation hole 85 is conveyed in the hose 76 by the compressed air while the head of the screw is directed downward. At the screw dropping port 78, the bit holder 38 of the screw fastener element 30 is waiting for the screw, and the fastening screw 400, with the head now directed downward, is accommodated in the holder 38b of the bit holder 38.

Reference numeral 90 is an air chuck mechanism having a pair of horizontal chucks 92. This air chuck mechanism 90 extends from the base plate 12 and is arranged close to the screw dropping port 78. The horizontal chuck 92 holds and positions the bit holder 38 (screw holder 38b) with respect to the screw dropping port 78. After the screw fastener element 30 has been moved horizontally to a position directly below the screw dropping port 78, the screw fastener element 30 (bit holder 38) is raised. At this time, the air chuck mechanism 90 is operated, so that the bit holder 38 is held in a position corresponding with the screw dropping port 78 of the bit holder 38.

Next, a process will be explained below in which the lamp body 300 and the front lens 200 are pressed together and screwed from a lower portion of the lamp body 300 with an apparatus according to an embodiment of the present invention.

First, the jig 100, in which the upper jig 110 and the lower jig 120 are integrated, is conveyed onto the base plate 12 of the jig support stand 10 and positioned with respect to the base plate 12. The upper jig holding plate 24 is lowered and connected with the upper jig 110 by the clamps 27 so that the upper plate 24 and upper jig 110 are integrated. The upper jig 110 is greatly separated from the lower jig 120 by raising the upper jig holding plate 24 (upper jig 110). The front lens 200 is set in the upper jig 110 (the support frame 117 of the upper jig 110), and the lamp body 300 is set in the lower jig 120 (the holding frame 127). Then, the seal material 306 is applied to the seal groove 302 of the lamp body 300. Then the upper jig holding plate 24 (the upper jig 110) is lowered, and the seal leg 202 is engaged with the seal groove 302, so that the front lens 200 and the lamp body 300 are pressed together.

Simultaneously, while the lens 200 (seal leg 202) and the lamp body 300 (seal groove 302) are pressed together, the two-axis scalar robot 60 begins its operation. The fastening screw 400 is dropped into the bit holder 38 of the screw fastener 30 directly beneath the screw dropping port 78. After the screw fastener element 30 receives the fastening screw 400, it moves horizontally to a position directly below the estimated screw fastening position $P_2$. The rodless air cylinder 50 operates the screw fastener element 30 to raise, and then the bit holder 38 is inserted into the through-hole (bit holder insertion hole) 128a. Then the rotary bit 33 (bit body 35) is rotated. The fastening screw 400 rotates together with the rotary bit 33 with rising, and pierces through the seal groove 302 and screws into the screw insertion hole 204 of the seal leg 202. In this way, the seal leg 202 and the seal groove 302 are secured together by the fasteners.

Figure 10:
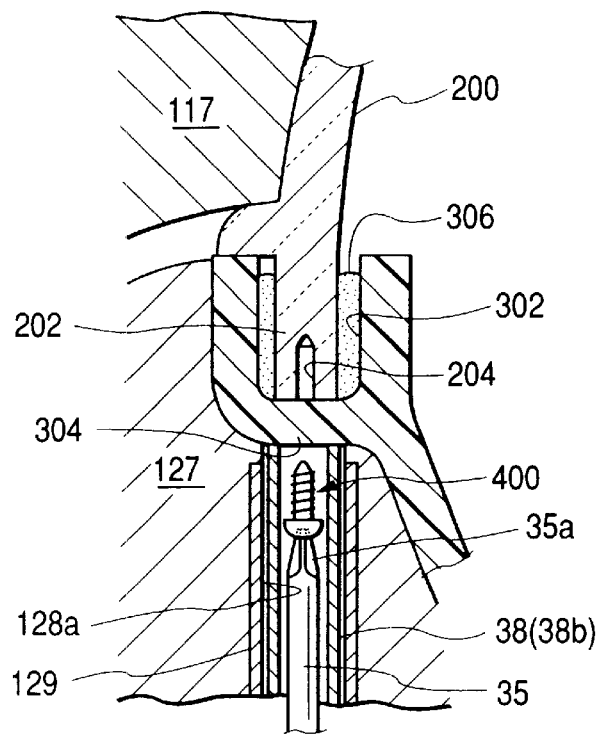
FIG. 10 is an enlarged cross-sectional view showing a portion of the device according to the second embodiment of the present invention.
Figure 12:
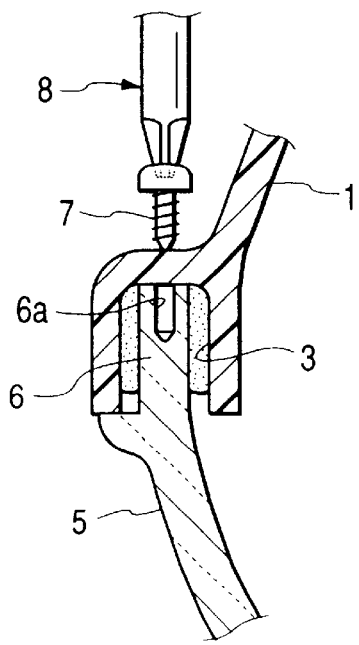
FIG. 12 is a schematic illustration of a conventional process of fastening a screw between a seal groove and a seal leg.
Figure 11A:
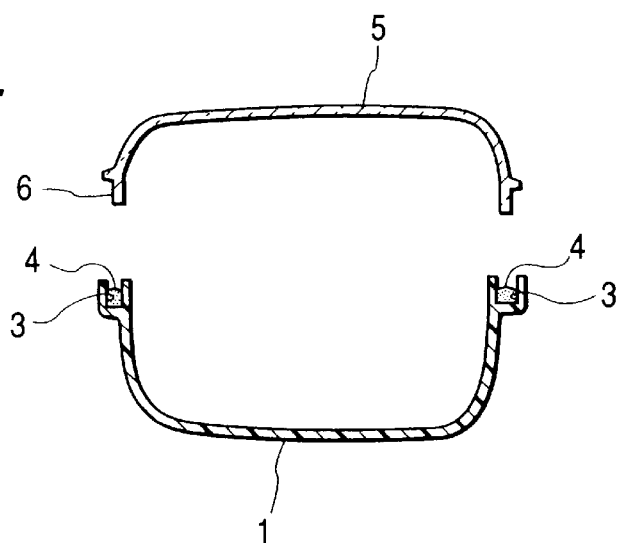
FIGS. 11A to 11C are schematic illustrations of conventional process in which a lamp body and lens are attached to each other by applying pressure and fastened by screws.
Figure 11B:
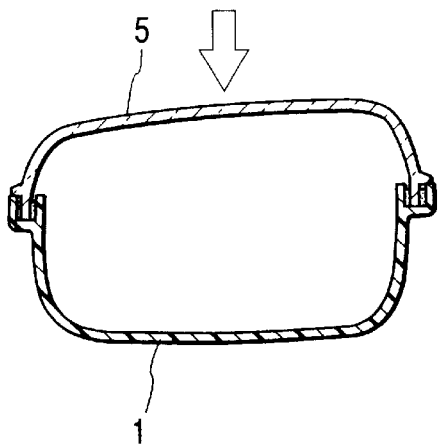
Figure 11C:
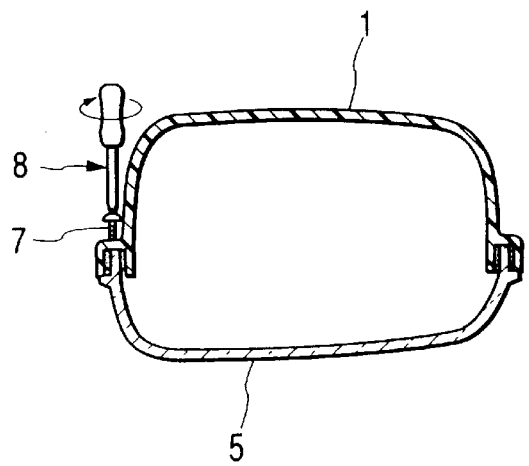

In the above embodiment, the holder contact section (step section) $128a_1$ comes into contact with the rising bit holder 38 which is arranged in the bit holder insertion hole 128a. However, the forward end portion of the bit holder 38 may also directly contact the seal groove forming wall 304 of the lamp body 300 if the holder contact section in the bit holder insertion hole 128a is not provided as shown in FIG. 10.

As can be seen in the above embodiments, there is little possibility that the seal material will drip out from the seal groove in the screw fastening process. Accordingly, it is possible to transit from the sealing process to the screw fastening process before the sealing material solidifies. Therefore, it is possible to shorten the process time of attaching the lamp body to the front lens using screw fastening.

Further, it is unnecessary to invert the lamp body and the front lens after they are assembled together. Therefore, it is possible to simplify the screw fastening process.

Also, according to the invention described above, a fastening screw can be positively engaged at a position between the lamp body and the front lens by the screw fastener element arranged beneath the body holding means. Therefore, the screw fastening work can be easily performed.

Further, the fastening screw supplied to the forward end portion of the bit holder is easily engaged with the forward end engaging protrusion of the rotary bit. Therefore, the screw fastening can be smoothly performed.

The screw fastener element can also be smoothly moved in the horizontal direction between the screw dropping port position and the estimated screw fastening position. Therefore, the screw fastening can be smoothly performed.

The height of the entire screw fastener element and elevating mechanism can be reduced. Therefore, the height of the jig stand can be reduced. Accordingly, the screw fastening process can be easily performed.

Also when the screw fastener element (bit holder) is raised, the bit holder is guided by the holder guide and appropriately inserted into the guide path of the lower jig. Therefore, the screw fastening process can be smoothly performed.

The screw fastener element can be smoothly and effectively moved in the horizontal direction between the screw dropping port position and the estimated screw arrangement estimated position by the two-axis scalar robot. Therefore, the screw can be positively and smoothly fastened.

What is claimed is:

1. A method of fastening a screw between a lamp body and a lens, comprising steps of:

holding the lamp body by a body holding device so that a seal groove of said lamp body is directed upward;

holding and lowering the lens with a lens holding device so that a seal leg of the lens is directed downward toward the lamp body;

pressing the seal leg into the seal groove;

positioning a fastening screw beneath the lamp body so that the fastening screw is directed upward through the lamp body; and fastening the lamp body to the lens using the fastening screw.

2. A device for fastening a screw between a lamp body and a lens comprising:

a body holding device for holding the lamp body so that a seal groove of the lamp body is directed upward;

a lens holding device for holding the lens so that a seal leg of the lens is directed downward toward the lamp body and for pressing the seal leg into the seal groove when the lens is lowered to the lamp body held by the body holding device; and a screw fastener for fastening a screw between the lamp body and the lens when the screw is positioned beneath the lamp body and directed upward; wherein said screw fastener comprises:

a case capable of being elevated by an elevating mechanism;

a rod-shaped rotary bit extending upward and pivotally supported by said case, said bit having an engaging protrusion capable of engaging an engaging groove formed in the screw; and a moveable cylindrical bit holder incorporated into said case and being capable of sliding within said case in a vertical axial direction, and extending in such a manner that said cylindrical bit holder surrounds said bit, said cylindrical bit holder being biased upwardly by a spring, wherein said bit holder is guided and elevated from directly beneath the lamp body seal groove, so that the screw is fastened through the lamp body in said body holding device into the lens.

3. The fastening device according to claim 2, wherein an air suction device, for holding the screw in a vertical position, is provided within said bit holder.

4. The fastening device according to claim 3, wherein said body holding device includes:

a lower jig for holding the lamp body in an upward orientation; and a jig support stand for supporting said lower jig, and wherein said lens holding device includes:

an upper jig for holding the lens in a downward orientation; and an elevating mechanism for elevating said upper jig, and wherein said fastening device further includes:

a rodless air cylinder for elevating said screw fastener, said cylinder being arranged in parallel with said screw fastener within said jig support stand; and a horizontal oscillating mechanism which supports the air cylinder so that said screw fastener is movable in the horizontal direction; and a screw inversion supply mechanism, including a screw dropping port by which a fastening screw, the screw head of which is initially directed upward as supplied by a screw supply machine, is inverted, dropped and supplied to a forward end section of said bit holder of said screw fastener, said screw dropping port being horizontally separated from said lower jig on said jig support stand.

5. The fastening device according to claim 4, wherein said air cylinder includes a holder guide for supporting said bit holder so that said bit holder can be slid in the axial direction.

6. The fastening device according to claim 4, wherein said horizontal oscillating mechanism comprises a two-axis scalar robot including a first arm horizontally oscillating around a first vertical axis fixed to said jig support stand and a second arm horizontally oscillating around a second vertical axis positioned on an oscillating forward end section of said first arm.

7. The fastening device according to claim 2, wherein said body holding device includes:

a lower jig for holding the lamp body in an upward orientation; and a jig support stand for supporting said lower jig, and wherein said lens holding device includes:

an upper jig for holding the lens in a downward orientation; and an elevating mechanism for elevating said upper jig, and wherein said fastening device further includes:

a rodless air cylinder for elevating said screw fastener, said cylinder being arranged in parallel with said screw fastener within said jig support stand; and a horizontal oscillating mechanism which supports the air cylinder so that said screw fastener is movable in the horizontal direction; and a screw inversion supply mechanism, including a screw dropping port by which a fastening screw, the screw head of which is initially directed upward as supplied by a screw supply machine, is inverted, dropped and supplied to a forward end section of said bit holder of said screw fastener, said screw dropping port being horizontally separated from said lower jig on said jig support stand.

8. The fastening device according to claim 7, wherein said air cylinder includes a holder guide for supporting said bit holder so that said bit holder can be slid in the axial direction.

9. The fastening device according to claim 7, wherein said horizontal oscillating mechanism comprises a two-axis scalar robot including a first arm horizontally oscillating around a first vertical axis fixed to said jig support stand and a second arm horizontally oscillating around a second vertical axis positioned on an oscillating forward end section of said first arm.

10. The fastening device according to claim 2, wherein said bit holder includes a screw holder and a bit holder body, and said screw holder is provided on the forward end side of said bit holder, and wherein a difference between an outer diameter of a screw head of the screw and the inner diameter of said screw holder is set at a low value.

11. The fastening device according to claim 2, wherein said bit holder includes a screw holder and a bit holder body, and said screw holder is provided on the forward end side of said bit holder, and wherein a clearance between the inner diameter of said bit holder body and the outer diameter of a rotary shaft of said rod-shaped rotary bit is set at a high value.

12. The fastening device according to claim 2, wherein said bit holder includes a screw holder and a bit holder body, and said screw holder is provided on the forward end side of said bit holder, and wherein said screw holder includes longitudinal grooves on the inner circumferential surface at the substantial center in the longitudinal direction.

* * * * *